US012047321B2

(12) United States Patent
Kuo et al.

(10) Patent No.: US 12,047,321 B2
(45) Date of Patent: Jul. 23, 2024

(54) RESOURCE ALLOCATION FOR TRANSMISSION OF DUPLICATES OF DATA IN WIRELESS COMMUNICATION NETWORKS

(71) Applicant: Nokia Technologies Oy, Espoo (FI)

(72) Inventors: Ping-Heng Kuo, London (GB); Daniela Laselva, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 414 days.

(21) Appl. No.: 17/604,056

(22) PCT Filed: May 2, 2019

(86) PCT No.: PCT/EP2019/061299
§ 371 (c)(1),
(2) Date: Oct. 15, 2021

(87) PCT Pub. No.: WO2020/221461
PCT Pub. Date: Nov. 5, 2020

(65) Prior Publication Data
US 2022/0109545 A1  Apr. 7, 2022

(51) Int. Cl.
*H04L 5/00* (2006.01)
*H04L 1/08* (2006.01)

(52) U.S. Cl.
CPC ............. *H04L 5/0053* (2013.01); *H04L 1/08* (2013.01); *H04L 5/0098* (2013.01)

(58) Field of Classification Search
CPC ........ H04L 5/0053; H04L 1/08; H04L 5/0098

USPC ........................................................ 370/329
See application file for complete search history.

(56) References Cited

U.S. PATENT DOCUMENTS

| 2012/0250631 | A1* | 10/2012 | Hakola | H04W 72/569 |
|---|---|---|---|---|
| | | | | 370/329 |
| 2021/0126746 | A1* | 4/2021 | Li | H04L 5/0055 |
| 2022/0030616 | A1* | 1/2022 | Xiao | H04W 80/00 |

FOREIGN PATENT DOCUMENTS

| WO | 2020/088771 | A1 | | 5/2020 | |
|---|---|---|---|---|---|
| WO | 2020/089451 | A1 | | 5/2020 | |
| WO | WO-2020088771 | A1 | * | 5/2020 | ............... H04L 1/08 |
| WO | 2020/164081 | A1 | | 8/2020 | |

OTHER PUBLICATIONS

Nokia, Enhancements for uplink PDCP Duplication, 3 pages (Year: 2019) (Year: 2019).*

(Continued)

*Primary Examiner* — Christopher M Crutchfield
*Assistant Examiner* — Jean F Voltaire
(74) *Attorney, Agent, or Firm* — Robert P. Michal, Esq.; Carter, DeLuca & Farrell LLP (57) ABSTRACT

According to an example aspect of the present invention, there is provided a method comprising, receiving a plurality of sets of radio resource configurations for communicating data via a first logical channel, determining a configuration of duplication and activating, based on a criterion associated with the configuration of duplication, one set of radio resource configurations from the plurality of sets of radio resource configurations for communication of said data via the first logical channel.

11 Claims, 7 Drawing Sheets

(56) References Cited

OTHER PUBLICATIONS

Nokia, Enhacements for uplink PDCP Duplication, 3 pages (Year: 2019).*
Huawei, Activation/deactivation of PDCP duplication of to 4 legs, 3 pages (Year: 2019).*
Nokia, Dynamic Adaptation of PDCP Duplication, 7 pages (Year: 2019).*
"New WID: Support of NR Industrial Internet of Things (IoT)", 3GPP TSG RAN Meeting #83, RP-190728, Agenda: 9.1.2, Nokia, Mar. 18-21, 2019, 6 pages.
"3rd Generation Partnership Project; Technical Specification Group Radio Access Network; Study on NR Industrial Internet of Things (IoT); (Release 16)", 3GPP TR 38.825, V16.0.0, Mar. 2019, pp. 1-33.
"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.
"Activation/deactivation of PDCP duplication of up to 4 legs", 3GPP TSG-RAN WG2 Meeting 105bis, R2-1903372, Agenda: 11.7.4, Huawei, Apr. 8-12, 2019, 3 pages.
"Discussion on data duplication for IIoT", 3GPP TSG-RAN WG2 #105bis, R2-1903810, Agenda: 11.7.4, Oppo, Apr. 8-12, 2019, 5 pages.
"MAC CE format for PDCP duplication", 3GPP TSG-RAN WG2 #105bis, R2-1904062, Agenda: 11.7.4, Ericsson, Apr. 8-12, 2019, 2 pages.
"Dynamic control of PDCP duplication leg", 3GPP TSG-RAN WG2 #105bis, R2-1904675, Agenda: 11.7.4, LG Electronics Inc, Apr. 8-12, 2019, pp. 1-3.
"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.
"3rd Generation Partnership Project; Technical Specification Group Radio Access Network; NR; Physical layer procedures for control (Release 15)", 3GPP TS 38.213, V15.5.0, Mar. 2019, pp. 1-104.
International Search Report and Written Opinion received for corresponding Patent Cooperation Treaty Application No. PCT/EP2019/061299, dated Jan. 27, 2020, 12 pages.
"Enhancements for Uplink PDCP Duplication", 3GPP TSG-RAN WG2 Meeting #105, R2-1901353, Agenda: 11.7.4, Nokia, Feb. 25-Mar. 1, 2019, 3 pages.
"An Overview of Resource-Efficient PDCP Duplication Schemes", 3GPP TSG-RAN WG2 Meeting #105bis, R2-1904074, Agenda: 11.7.4, Nokia, Apr. 8-12, 2019, 5 pages.
"Dynamic Adaptation of PDCP Duplication", 3GPP TSG-RAN WG2 Meeting #105bis, R2-1904075, Agenda: 11.7.4, Nokia, Apr. 8-12, 2019, 7 pages.
"Enhancement of resource efficiency for duplication based on MAC CE", 3GPP TSG-RAN WG2 Meeting 105bis, R2-1904896, Agenda: 11.7.4, Huawei, Apr. 8-12, 2019, 2 pages.

* cited by examiner

RESOURCE ALLOCATION FOR TRANSMISSION OF DUPLICATES OF DATA IN WIRELESS COMMUNICATION NETWORKS

RELATED APPLICATION

This application claims priority to PCT Application No. PCT/EP2019/061299, filed on May 2, 2019, each of which is incorporated herein by reference in its entirety.

FIELD

Various example embodiments relate in general to wireless communication networks, and more specifically to resource allocation for transmission of duplicates of data in such networks.

BACKGROUND

Efficient resource allocation is in general very important in wireless communication networks because resources that are available for communication are typically limited. On the other hand, there is a need to transmit duplicates of certain types of data to improve reliability of transmissions, which naturally consumes more resources than a single transmission of data. Consequently, efficiency of resource allocation for transmission of duplicates of data has gained attention especially recently.

Transmission of duplicates of data may be exploited in various wireless communication networks, such as, in cellular networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR. One of the topics in the 3GPP discussions is related to providing reliable communications, and according to the discussions there is a need to provide improved methods, apparatuses and computer programs for enabling efficient resource allocation for transmission of duplicates of data.

SUMMARY

According to some aspects, there is provided the subject-matter of the independent claims. Some embodiments are defined in the dependent claims.

According to a first aspect, there is provided a first method comprising, configuring, and/or transmitting, a plurality of sets of radio resource configurations for communicating data via a first logical channel, determining a configuration of duplication and activating, based on a criterion associated with the configuration of duplication, one set of radio resource configurations from the plurality of sets of radio resource configurations for communicating said data via the first logical channel.

According to the first method, the first logical channel may be for communicating one duplicate of said data, and the method may further comprise communicating one duplicate of said data using the activated set of radio resource configurations.

According to the first method, the radio resource configurations may be Semi-Persistent Scheduling, SPS, configurations or Configured Grant, CG, configurations.

According to the first aspect, the first method may further comprise transmitting an indication about the configuration of duplication or the criterion associated with the configuration of duplication.

According to the first method, said criterion associated with the configuration of duplication may comprise information about a configuration relating to at least one second logical channel or an architecture selected for the duplication, said architecture comprising preferably a Carrier Aggregation, CA, Dual Connectivity, DC, or a combination of CA and DC.

According to the first method, said criterion associated with the configuration of duplication may comprise characteristics of at least one carrier for at least one second logical channel. Moreover, said characteristics may comprise information about whether the at least one second logical channel is configured for communication on at least one carrier of licensed spectrum or at least one carrier of unlicensed spectrum.

According to the first method, said criterion associated with the configuration of duplication may comprise a number of copies of the data to be communicated.

According to the first method, the first logical channel may be associated with a first activated Radio Link Control, RLC, entity.

According to the first method, the data may comprise a Protocol Data Unit, PDU, and communicating duplicates of data may comprise communicating duplicates of a Packet Data Convergence Protocol, PDCP, PDU.

According to the first method, a set of scaling and/or delta parameters may be selected, based on the criterion associated with the configuration of duplication, for each radio resource configuration of the at least one activated set of radio resource configurations, said parameters comprising preferably a number of repetitions, Modulation and Coding Scheme, MCS, and/or transmission power.

According to a second aspect, there is provided a second method comprising, receiving a plurality of sets of radio resource configurations for communicating data via a first logical channel, determining a configuration of duplication and activating, based on a criterion associated with the configuration of duplication, one set of radio resource configurations from the plurality of sets of radio resource configurations for communication of said data via the first logical channel.

According to the second method, first logical channel may be for communicating one duplicate of said data, and the method may further comprise communicating one duplicate of said data using the activated one set of radio resource configurations.

According to the second method, the radio resource configurations may be Semi-Persistent Scheduling, SPS, configurations or Configured Grant, CG, configurations.

According to the second aspect, the second method may further comprise receiving an indication about the configuration of duplication or the criterion associated with the configuration of duplication.

According to the second method, said criterion associated with the configuration of duplication may comprise information about a configuration of at least one second logical channel or an architecture selected for the duplication, said architecture comprising preferably a Carrier Aggregation, CA, Dual Connectivity, DC, or a combination of CA and DC.

According to the second method, said criterion associated with the configuration of duplication may comprise characteristics of at least one carrier for at least one second logical channel.

According to the second method, said characteristics may comprise information about whether the at least one second logical channel is configured for communication on at least one carrier of licensed spectrum or at least one carrier of unlicensed spectrum.

According to the second method, said criterion associated with the configuration of duplication may comprise a number of copies of the data to be communicated.

According to the second method, the first logical channel may be associated with an activated Radio Link Control, RLC, entity.

According to the second method, the data may comprise a Protocol Data Unit, PDU, and communicating duplicates of data may comprise communicating duplicates of a Packet Data Convergence Protocol, PDCP, PDU.

According to the second method, a set of scaling and/or delta parameters may be selected, based on the criterion associated with the configuration of duplication, for each radio resource configuration of the at least one activated set of radio resource configurations, said parameters comprising preferably a number of repetitions, Modulation and Coding Scheme, MCS, and/or transmission power.

According to a third aspect of the present invention, there is provided an apparatus comprising at least one processing core, at least one memory including computer program code, the at least one memory and the computer program code being configured to, with the at least one processing core, cause the apparatus at least to perform the first method.

According to a fourth aspect of the present invention, there is provided an apparatus comprising at least one processing core, at least one memory including computer program code, the at least one memory and the computer program code being configured to, with the at least one processing core, cause the apparatus at least to perform the second method.

According to a fifth aspect of the present invention, there is provided an apparatus comprising means for performing the first method. According to a sixth aspect of the present invention, there is provided an apparatus comprising means for performing the second method.

According to a seventh aspect of the present invention, there is provided non-transitory computer readable medium having stored thereon a set of computer readable instructions that, when executed by at least one processor, cause an apparatus to at least perform the first method. According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

EMBODIMENTS

Resource allocation for transmission of duplicates of data in wireless communication networks may be improved by the procedures described herein. More specifically, embodiments of the present invention enable selection and activation (or modification) of one radio resource configuration set from a plurality of provisioned sets of radio resource configurations, for duplication of data. Said radio resource configuration set may be selected based on a criterion which is associated a configuration of duplication, such as for Packet Data Convergence Protocol, PDCP, duplication. The configuration of duplication may also be referred to as an overall configuration of radio resources for duplication of data. The radio resource configurations may be semi-persistent radio resource configurations. For instance, the radio resource configurations may be Configured Grant, CG, configurations or Semi-Persistent Scheduling, SPS, configurations.

The criterion which is related to configuration of duplication may comprise for example a total number of copies of data to be transmitted, e.g., a total number of PDCP Protocol Data Unit, PDU, copies used at a time. The total number of copies of data to be transmitted may correspond to a number of activated duplication legs, or equivalently the number of activated RLC entities for a DRB. Alternatively, or in addition, the criterion which is related to a configuration of duplication may be related to characteristics of at least one carrier for at least one other Logical Channel, LCH, corresponding to RLC entities which are also chosen and activated for duplication. For instance, it may be taken into account whether one or more carriers of other selected legs are operating on unlicensed spectrum or not. In another example, the criterion which is related to configuration of duplication may be related to the architecture selected for the duplication, e.g. if the duplication is configured to be conducted with Carrier Aggregation, CA, Dual-Connectivity, DC, or combination of CA and DC. In general, embodiments of the present invention are applicable for both, uplink and downlink.

Figure 1:
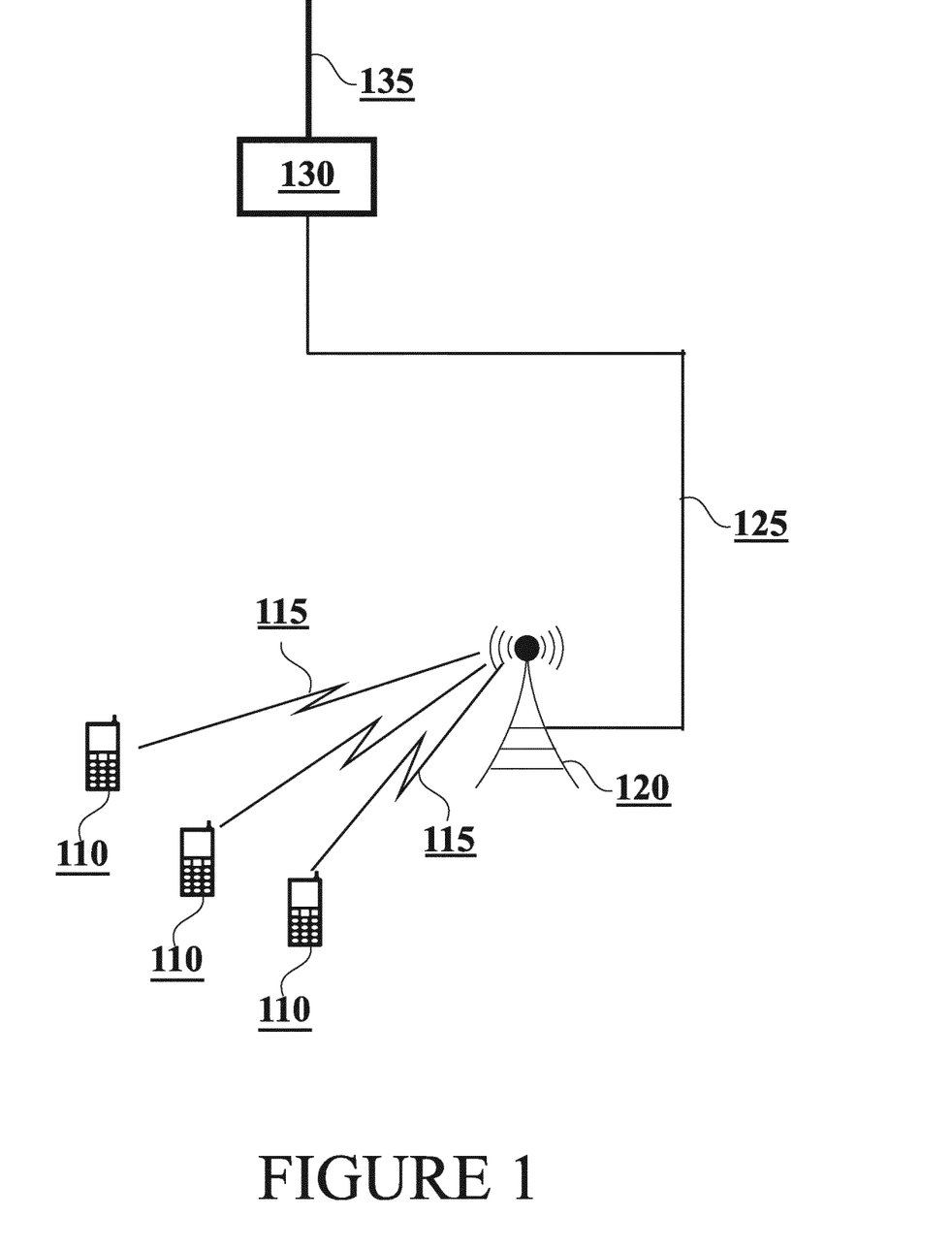
FIG. 1 illustrates an exemplary network scenario in accordance with at least some example embodiments.

FIG. 1 illustrates an exemplary network scenario in accordance with at least some example embodiments. According to the example scenario of FIG. 1, there may be a wireless communication system, which comprises one or more User Equipments, UEs, 110, Base Station, BS, 120, and core network element 130. UEs 110 may be connected to BS 120 via air interface 115.

UEs 110 may comprise, for example, a smartphone, a cellular phone, a Machine-to-Machine, M2M, node, Machine-Type Communications node, MTC, an Internet of Things, IoT, node, a car telemetry unit, a laptop computer, a tablet computer or, indeed, any kind of suitable wireless terminal or station. In the example system of FIG. 1, UEs 110 may communicate wirelessly with BS 120, or with a cell of BS 120, via air interface 115. In some example embodiments, BS 120 may be considered as a serving BS for UEs 110.

BS 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. BS 120 may be connected with at least one other BS as well via an inter-BS interface (not shown in FIG. 1), even though in some example embodiments the inter-BS interface may be absent. BS 120 may be connected, directly or via at least one intermediate node, with core network 130 or with another core network.

Air interface 115 between UEs 110 and BS 120 may be configured in accordance with a Radio Access Technology, RAT, which UEs 110 and BS 120 are configured to support. Examples of cellular RATs include Long Term Evolution, LTE, New Radio, NR, which may also be known as fifth generation, 5G, radio access technology and MulteFire. For example, in the context of LTE, BS 120 may be referred to as eNB while in the context of NR, BS 120 may be referred to as gNB. In any case, example embodiments are not restricted to any particular wireless technology. Instead, example embodiments may be exploited in any wireless communication network, wherein duplicates of data may be transmitted using allocated resources.

Transmission of duplicates of data is considered for example in the context of 5G/NR. More specifically, in order to enable Ultra-Reliable Low-Latency Communications, URLLC, PDCP duplication may be adopted in 5G/NR networks. PDCP duplication refers to a transmission of one PDCP PDU, and its duplicate over two separate communication paths (primary and secondary), thereby improving reliability and reducing latency of the transmission. Similar enhancements may be exploited for various applications, even with more stringent requirements, such as for Industrial Internet of Things, IIoT, applications. PDCP duplication, or duplication of data in general, may be exploited for improving resource efficiency and/or performance by increasing a number of duplication legs, for example via CA and DC combinations. A duplication leg may refer to one communication path and one copy of the data, such as one copy of a PDCP PDU, may be transmitted via one duplication leg. In addition, one duplication leg may be associated with one Radio Link Control, RLC, entity. Furthermore, one RLC entity may be associated with one LCH.

For example, objectives for PDCP duplication may comprise specifying PDCP duplication up to 4 RLC entities configured by Radio Resource Control, RRC, in architectural combinations such as CA and NR-DC in combination with CA. The objectives for PDCP duplication may also comprise specifying mechanisms for dynamically controlling how a set, or a subset, of configured RLC or duplication legs may be used. In addition, activation/deactivation mechanisms for PDCP duplication may be specified with UE-based criteria and/or BS-control. Also, enhancements for more efficient downlink PDCP duplication for NR-DC case may be specified. Enhancements may be specified to address potential impact of higher-layer multi-connectivity as well.

Figure 2:
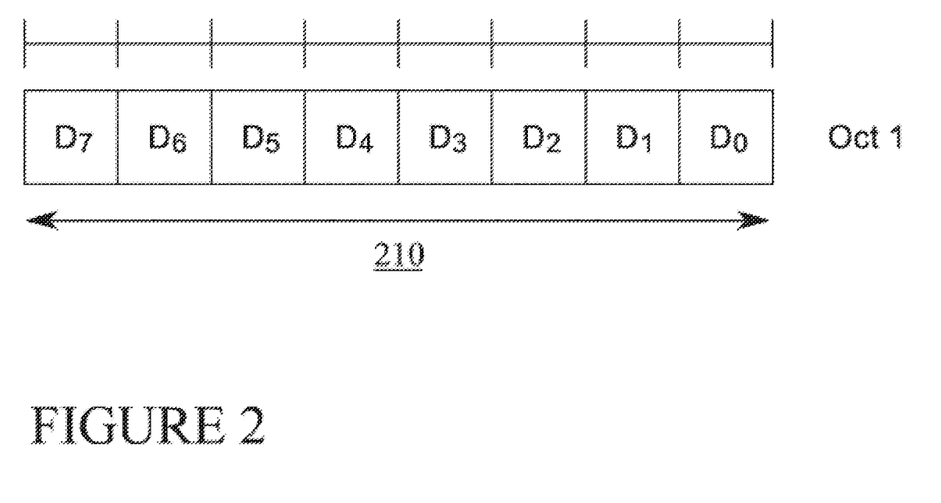
FIG. 2 illustrates an example of an activation/deactivation control element for duplication in accordance with at least some embodiments.

FIG. 2 illustrates an example of an activation/deactivation control element for duplication in accordance with at least some embodiments. Duplication may be activated/deactivated by a BS, such as BS 120 of FIG. 1, in uplink direction. In some embodiments of the present invention, duplication may be activated/deactivated per Data Radio Bearer, DRB, to save radio resources required for PDCP duplication in uplink. For instance, the RRC layer may provide an initial configuration for each DRB concerning whether PDCP duplication is applicable, or not.

After the initial configuration, the activation status of each DRB, configured with PDCP duplication, may be indicated using the activation/deactivation control element, such as an activation/deactivation Media Access Control, MAC, Control Element, CE, shown in FIG. 2. As an example, according to a 3rd Generation Partnership Project, 3GPP, specification TS 38.231, Rel-15, the activation/deactivation MAC CE for duplication may be multiplexed into a Medium Access Control, MAC, PDU, to be able to activate or deactivate duplication for DRBs in a more dynamic manner.

In FIG. 2, field $D_i$ of the activation/deactivation control element for duplication may indicate an activation/deactivation of PDCP duplication of DRB wherein i may be in an ascending order of DRB identities among DRBs configured with PDCP duplication and with RLC entities associated with one MAC entity. The field $D_i$ may be set as one for indicating the PDCP duplication status of DRB i should be activated and the field $D_i$ may be set as zero for indicating the PDCP duplication status of DRB i should be deactivated. If PDCP duplication is activated for a specific DRB, all PDCP PDUs associated with the DRB in question should be duplicated by a UE, such as UE 110 of FIG. 1.

In general, a fixed resource allocation for a duplication leg may be inefficient, e.g., for cases wherein a number of duplication legs (and consequently a number of copies of data to be transmitted) may vary. Due to the dynamic nature of wireless networks, it may become inefficient if a fixed resource allocation, such as a given CG, is always applied whenever a corresponding duplication leg is chosen for duplication irrespective of the entire duplication configuration, the entire duplication configuration comprising used, active duplication legs and the status of the duplication legs.

For example, a pre-configured radio resource aiming for high reliability may be over-provisioned if a number of copies m is already sufficient to achieve the performance target. Conversely, in some cases a BS may only configure m=2 copies due to traffic loading issues although it might be insufficient to support the required QoS. In this case, provisioning more radio resources, e.g. for repetitions, on the chosen duplication legs may be needed to ensure that targeted reliability can be attained. Also, more flexible control is generally desirable.

Embodiments of the present invention therefore consider dynamic resource allocation for duplication legs and enable flexible and efficient allocation of radio resources, e.g., for UEs 110 operating using a dynamic PDCP duplication scheme, wherein radio resources may be dynamically re-configured. Moreover, embodiments of the present invention support transmission of two, or more than two, duplicates/copies of data at a time, depending on how duplication legs are selected by BS 120 for UE 110, or by UE 110 itself.

Embodiments of the present invention may be exploited for example in the context of 5G/NR, to improve radio resource efficiency for user-plane transmissions of uplink PDCP duplication while the performance is not compromised. In addition, at least some embodiments of the present invention support efficient signaling for switching duplications legs dynamically for uplink PDCP duplication, e.g., when considering up to 4 RLC entities (and thus, up to 4 copies via 4 duplication legs at a given time). That is to say, a BS may dynamically instruct a UE to duplicate a PDCP PDU over, e.g., m=1 (no duplication), 2, 3, or 4 duplication legs, depending on the performance target as well as the radio level and traffic loading across different serving cells via different duplication legs.

Moreover, if a duplication leg is activated for a duplicate transmission, it may be beneficial to provision certain radio resources on a corresponding carrier, e.g., by activating a CG configuration when duplication is activated on the duplication leg in question. Thus, duplicates/copies of data may be processed and transmitted immediately as soon as the duplication leg is selected for example for PDCP duplication, which effectively reduces the latency.

It should be noted that it is important for performance and efficiency not to waste time on signaling control commands to a UE, such as UE 110 of FIG. 1, for activating a resource allocation for the duplication leg that is selected for PDCP duplication.

A configuration message may be transmitted, from BS 120 to UE 110, for configuring more than radio resource configuration set, such as CG set or SPS set per DRB. That is to say, more than one set of radio resource configurations may be pre-configured per LCH corresponding to each RLC entity associated with this DRB. Also, selection rules may be transmitted, from BS 120 to UE 110, to determine which one of the radio resource configurations set should be used at a given time, for example based on the number of copies of data to be transmitted (value m). The number of copies of data may correspond to a number of activated duplication legs and thus further correspond to a number of activated RLC entities, and LCHs associated with the activated RLC entities. UE 110 may hence be able to dynamically select the radio resource configuration set, such as CG configurations, for transmission of data from an LCH in accordance with the selection rules.

Figure 3:
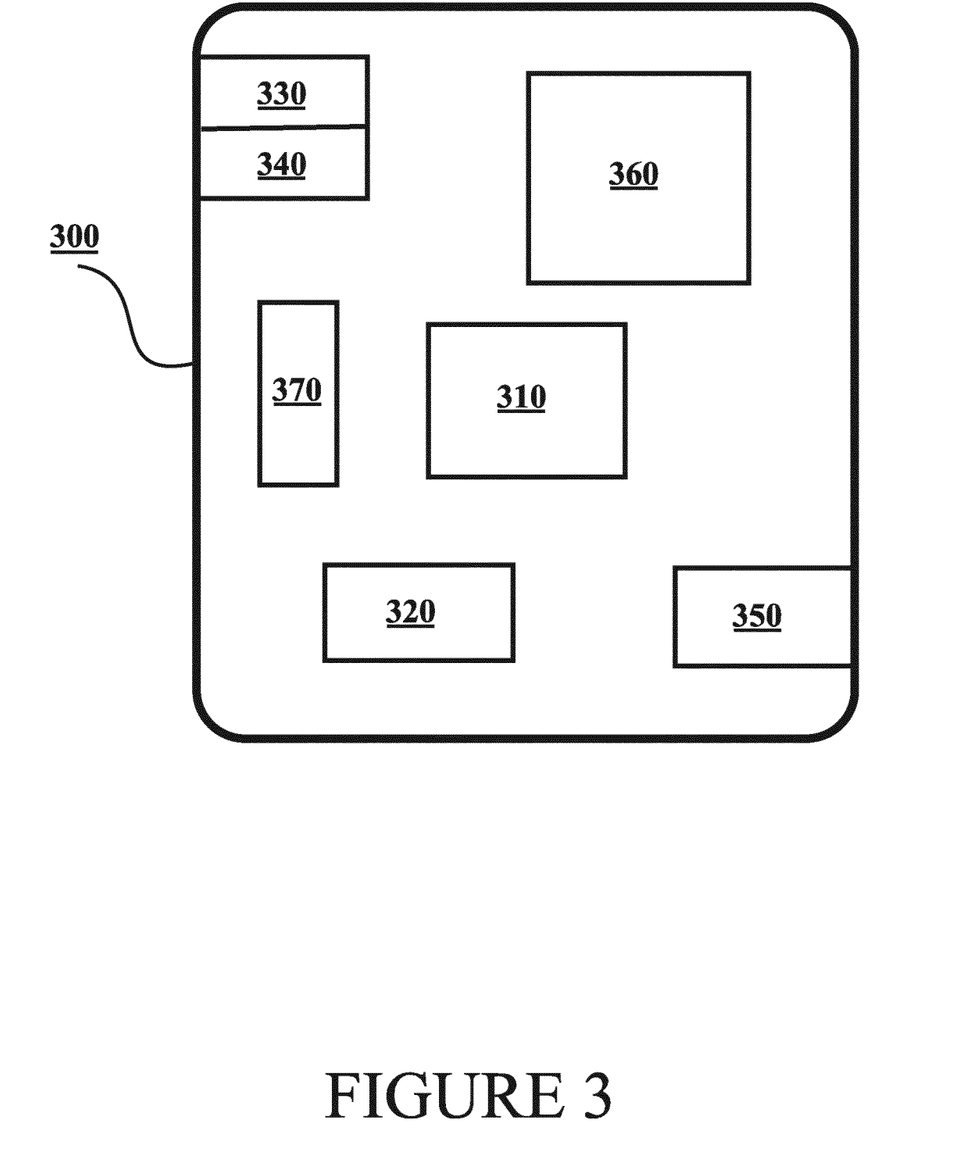
FIG. 3 illustrates an example apparatus capable of supporting at least some embodiments.

FIG. 3 illustrates an example apparatus capable of supporting at least some embodiments of the present invention. Illustrated is device 300, which may comprise, for example, UE 110 or BS 120 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example. In some embodiments of the present invention, communicating is used to cover both, transmitting and receiving.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
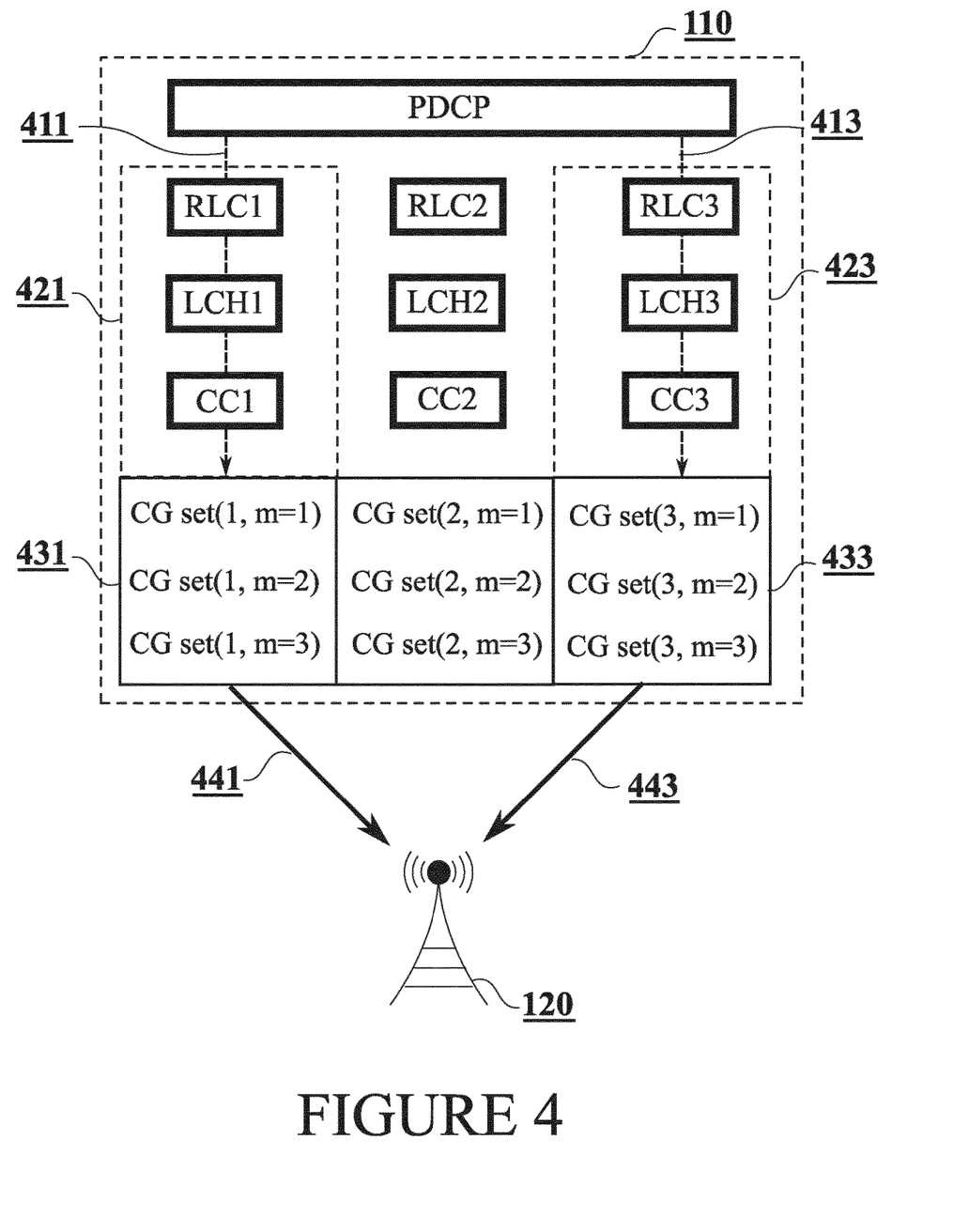
FIG. 4 illustrates CG selection and activation in accordance with at least some embodiments.

FIG. 4 illustrates CG selection and activation in accordance with at least some embodiments. Similar selection and activation may be applied for SPS configuration as well, or for any other suitable radio resource configuration. In FIG. 4, internal signaling inside UE 110 for a first duplication leg 421 is denoted by 411 and for a third duplication leg 423 by 413. UE 110 may be configured with multiple CG sets, comprising first set of CG sets 431 (comprising three sets, (1, m=1), (1, m=2) and (1, m=3)), second set of CG sets (comprising three sets, (2, m=1), (2, m=2) and (2, m=3), and third set of CG sets 433 (also comprising three sets, (3, m=1), (3, m=2) and (3, m=3), as a function of a number of copies, i.e., number of activated duplication legs (one duplication leg comprising one RLC entity and one LCH), denoted by m.

Moreover, UE 110 may be configured in such a way that each LCH, associated with at least one Component Carrier, CC, or a carrier in general, may be configured with different CG sets. As shown in FIG. 4, the first duplication leg 421 (RLC1/LCH1/CC1) may be configured with three CG sets (1, m=1), (1, m=2) and (1, m=3), a second duplication leg (RLC2/LCH2/CC2) may be configured with three CG sets (2, m=1), (2, m=2) and (2, m=3), and the third duplication leg 423 (RLC3/LCH3/CC3) may be configured with three CG sets (3, m=1), (3, m=2) and (3, m=3).

In some embodiments of the present invention, the CG configurations in all CG sets configured for one duplication leg (RLC/LCH/CC) may share some common parameters, such as periodicity and/or offset. However, every CG set configured for one duplication leg may differ from another in at least one transmission property, such as number of repetitions, used Modulation and Coding Scheme, MCS, and/or transmission power, thereby enabling efficient use of radio resources. For example, CG Set (1, m=1) may be configured for LCH1/RLC1, i.e., CG Set (1, m=1) may be associated with m=1. CG set (1, m=1) may comprise more repetitions and more robust MCS compared to a configured CG set (1, m=3), because in case of CG set (1, m=3) a larger number of copies is used for duplication. Hence, there may be no need for using a large number of repetitions or a robust MCS in case of (m=3) because when more duplication is used, each duplicate/copy may be transmitted with fewer resources and yet reaching the desired performance goal. Consequently, QoS targets may be fulfilled while achieving radio resource efficiency.

When an RLC entity, associated with one duplication leg, is activated for transmitting duplicates of data, one of the CG sets configured for a LCH corresponding to the RLC entity should be selected and activated (if not active yet). After the selection of one CG set for each LCH corresponding to an activated RLC entity, duplicates of data, such as PDU duplicates in case of PDCP PDU duplication, may be transmitted to BS 120 using the selected CG set, the selected set comprising a set of radio resource configurations such as CG configurations. In FIG. 4, transmission via RLC1/LCH1 (first duplication leg 421) and transmission via RLC3/LCH3 (third duplication leg 423) using radio resources associated to selectively activated CG set in each leg are denoted by 441 and 443 respectively, describing a scenario wherein RLC1 and RLC3 are activated for duplication.

In some embodiments of the present invention, selection of CG sets to activate across different active legs may depend on a criterion associated with a configuration of duplication, such as the total number of the activated RLC entities, i.e., activated duplication legs. For instance, if only RLC1 and RLC3 are selected, m=2, and hence CG set (1, m=2) and CG set (3, m=2) are activated. In some embodiments of the present invention, the information relating to the value m should be exchanged between different protocol layers for purposes of selecting the correct CG set. As an example, PDCP/RLC/RRC layer of UE 110 may provide the value m to MAC/PHY via internal signalling between protocol layers, within UE 110, as shown by arrows 411 and 413 in FIG. 4.

Alternatively, or in addition, at least two CG sets may be configured for a LCH, a first CG set may comprise CG configurations with more repetitions and/or more robust MCS that should be activated when at least one second LCH for duplication is configured for operation on a carrier of unlicensed spectrum, and a second CG set may comprise CG configurations with fewer or no repetitions and/or less robust MCS that should be activated when the at least one second LCH for duplication is configured for operation on carrier of licensed spectrum. That is to say, selection of a set of radio resource configurations to be used, such as the set of CG configurations, may depend on information associated with the configuration of PDCP duplication for a DRB, e.g., characteristics of at least one carrier for at least one second LCH, which may be associated with an activated RLC, such as whether the at least one second LCH is configured for operation on at least one carrier of licensed spectrum or at least one carrier of unlicensed spectrum Referring to FIG. 4 again, if for example LCH1, associated with activated RLC1, is considered as a first logical channel, and LCH3, associated with activated RLC3, is considered as at least one second logical channel, the selection of a radio resource configuration for LCH1 may be based on characteristics of a carrier for LCH3.

Figure 5:
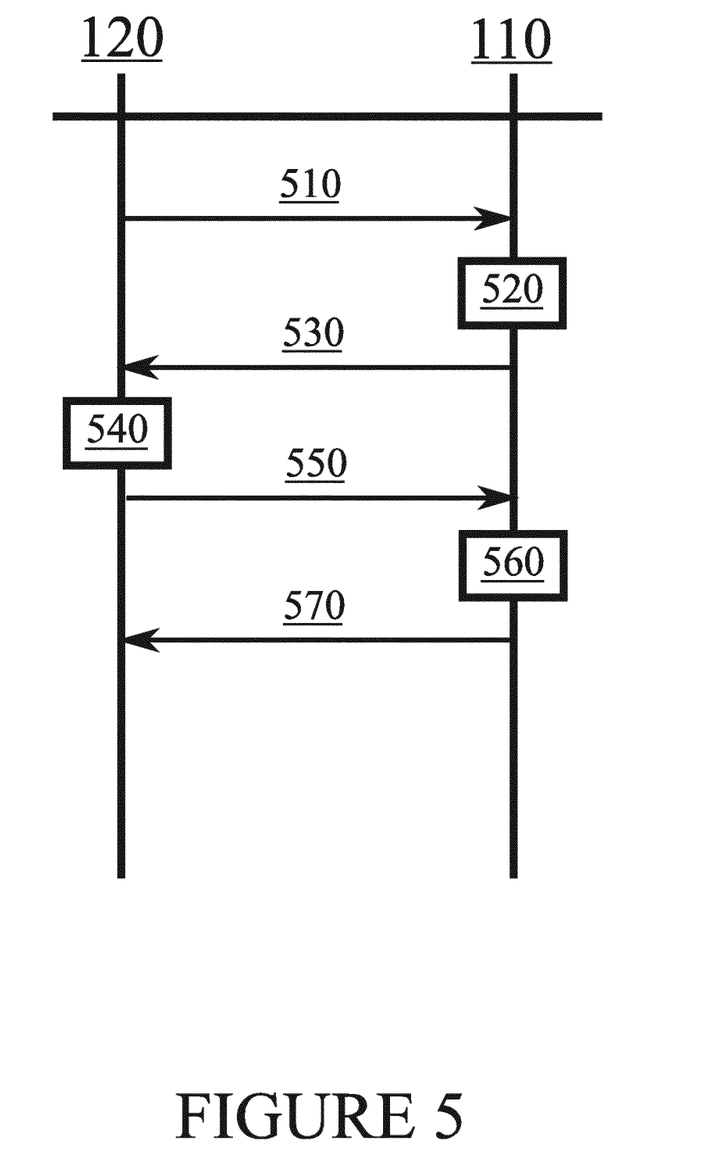
FIG. 5 illustrates an exemplary signaling graph in accordance with at least some embodiments.

FIG. 5 illustrates an exemplary signalling graph in accordance with at least some embodiments. On the vertical axes are disposed, from the left to the right, BS 120 and UE 110 of FIG. 1. Time advances from the top toward the bottom. First, a plurality of sets of radio resource configurations may be configured by a network, for example by BS 120, for UE 110, for one duplication leg, i.e., RLC entity associated with PDCP duplication and each set may comprise at least one radio resource configuration.

Each LCH may be pre-configured with multiple sets of radio resource configurations, wherein each set may further comprise one or more radio resource configurations, such as CG configurations. In some embodiments, each set may correspond to a value m and according to the value m, the associated set of radio resource configurations, e.g., m=2, may be activated. Thus, all the radio resource configurations in the associated set of radio resource configurations, e.g., m=2, may be activated for each LCH.

BS 120 may transmit, at step 510, the plurality of sets of radio resource configurations to UE 110. For example, there may be up to 4 RLC entities, and associated LCHs, for duplication of data, e.g., data of a DRB. In such a case, BS 120 may transmit information about CG sets for a first LCH (LCH1), CG sets for a second LCH (LCH2), CG sets for a third LCH (LCH3) and CG sets for a fourth LCH (LCH4) to UE 110. In some embodiments, BS 120 may also transmit conditions, or a criterion, for activating at least one set of CGs associated with a LCH. Said conditions, or a criterion may be associated to a configuration of duplication, such as the value m. The criterion associated with the configuration of duplication may be transmitted at step 510 as well, from BS 120 to UE 110. The transmissions may be done using RRC signaling, e.g., the criterion may be transmitted with RRC configuration.

Said radio resource configurations may be for example semi-persistent radio resource configurations, such as CG or SPS configurations. Each set of radio resource configurations may be associated with a criterion, the criterion being associated with a configuration of duplication. The criterion may be for example the value m, i.e., the total number of duplicates/copies of data to be sent, which may correspond to the total number of activated duplication legs (or equivalently the total number of activated RLC entities for a DRB). Alternatively, or in addition, the criterion associated with a configuration of duplication may be related to characteristics of carriers associated to at least one second activated duplication legs that are selected/activated for duplication. For instance, said characteristics may comprise information about whether at least one second activated duplication leg is configured for operation a carrier of licensed spectrum or unlicensed spectrum. BS 120 may configure a duplication leg, i.e., a carrier for a corresponding LCH, for operation on licensed frequency spectrum or unlicensed spectrum and hence it may be referred to as a criterion associated with the configuration of duplication. Moreover, the criterion associated with the configuration of duplication may be related to the architecture selected for the duplication, e.g. if the duplication is configured to be conducted with CA, DC, or combination of CA and DC.

Therefore, a duplication leg, such as a LCH/CC associated with a corresponding RLC entity may be configured with multiple sets of different radio resource configurations. Similarly, UE 110 may be configured with a plurality of radio resource configuration sets for one duplication leg, each set corresponding to different configurations for transmitting duplicates of data, such as for PDCP duplication. That is to say, there may be a plurality of sets for a specific duplication leg, such as a RLC entity or LCH associated with the RLC entity in question.

As mentioned in connection with FIG. 4, all radio resource configuration sets of one duplication leg may share some common parameters, such periodicity and/or offset. However, every radio resource configuration set differs from another in at least one transmission property, such as number of repetitions, MCS or transmission power.

In some embodiments of the present invention, only one radio resource configuration, such as CG configuration, may be configured per LCH as such. However, in such a case each LCH may be configured with scaling and/or delta parameters for parameters relating to the radio resource configuration, thereby allowing the UE to modify the parameters relating to the radio resource configuration, in accordance to the criterion being associated with a configuration of duplication. The scaling and/or delta parameters may be thus seen as radio resource configurations as well, for example in terms of repetitions and/or MCS. In some other embodiments, said scaling and/or delta parameters may be common for the plurality of LCHs.

After step 510, RLC/LCH activation may be performed for duplication. For this, BS 120 may determine a configuration of duplication and possibly transmit an indication about the configuration of duplication to UE 110. UE 110 may determine the configuration of duplication, e.g., based on the received indication. Alternatively, or in addition, BS 120 may transmit a criterion associated with the configuration of duplication to UE 110.

In some embodiments, BS 120 may select/activate and indicate to UE 110 a subset of m RLC entities for duplication of data, such as for PDCP duplication. For instance, BS 120 may transmit an activation/deactivation control signaling for duplication. The control signaling may comprise activation/deactivation control element, such as a MAC CE, shown in FIG. 2. That is to say, the control signaling may be for selection of duplication legs. For instance, BS 120 may send the MAC CE to activate PDCP duplication with selection of, for example, RLC entity 2 and RLC entity 4 (corresponding to LCH2 and LCH4, respectively) for such operation. Alternatively, or in addition, UE 110 may decide how many RLC entities (and the corresponding LCHs) to activate and which RLC entities (and the corresponding LCHs) to activate.

At step 520, UE 110 may select/activate one radio resource configuration for each LCH corresponding to each activated RLC entity (dubbed as activated LCH) for duplication. Selection/activation may be based on a criterion associated with a configuration of duplication. At step 520, UE 110 may for example check the value m, i.e., the total number of selected duplication legs, which corresponds to the total number of selected LCHs and to a total number of copies of data to be transmitted. So if RCL2 and RCL4 are to be activated (corresponding to selection of LCH2 and LCH4, respectively), the radio resource configuration sets associated with m=2 may be selected, e.g., for transmission of packets on a certain DRB.

Alternatively, or in addition, the radio resource configuration of a first LCH associated with an activated RLC, i.e., LCH2, may be selected/activated based on characteristics of at least one carrier for at least one second LCH associated with an activated RLC, i.e., LCH4. Said characteristics may comprise information about whether LCH4, i.e., the at least one second LCH associated with an activated RLC, is configured for operation on at least one carrier of licensed spectrum or at least one carrier of unlicensed spectrum. In such a case, UE 110 may check if other activated duplication legs, i.e., the at least one second LCH, associated with at least one activated RLC, are operating on at least one carrier of an unlicensed spectrum. So UE 110 may check, when selecting a radio resource configuration for LCH2, whether LCH4 is configured for operation on a carrier of a licensed spectrum or a carrier of an unlicensed spectrum. If there is at least one second LCH associated with an activated RLC, such as LCH4, operating on at least one carrier of an unlicensed spectrum, UE 110 may decide to use more robust CG set for LCH2. For instance, a CG set corresponding to CG set (2, m=1) may be used. Alternatively, if there is no second LCH associated with an activated RLC and configured for operation on a carrier of an unlicensed spectrum, UE 110 may decide to use a less robust CG set for LCH2. For instance, a CG set corresponding to CG set (2, m=3) may be used.

Selection/activation of a radio resource configuration, such as a CG or SPS configuration, for a first LCH associated with activated RLCs may be hence based on information associated with, or about, a configuration of at least one second LCH, wherein the at least one second LCH may be associated with an activated RLC. For example, when the number of LCHs associated with activated RLCs, m, increases, reliability would increase as well and a less robust CG set may be chosen. However, when the number of LCHs associated with activated RLCs, m decreases, reliability would decrease and a more robust CG set may be chosen to compensate for that. Similarly, if all other LCHs associated with activated RLCs are using carriers of licensed spectrum, reliability may be high and a less robust CG set may be chosen. But if at least one second LCH associated with an activated RLC is using a carrier of an unlicensed spectrum, reliability may be lower and a more robust CG set may be chosen.

As each LCH is associated with a specific RLC entity, one radio resource configuration may be selected and activated for the RLC entity in question. In some embodiments, the RLC entity has been activated already, e.g. upon receiving the activation/deactivation control signaling for duplication. In some embodiments of the present invention, the lower layer, such as MAC layer, may be given the value m for selecting/activating a radio resource configuration from a set of radio resource configurations. The value m may be provided via internal signaling within UE 110 for example, as shown in FIG. 4. The value m may be provided by a PDCP layer or a RRC layer of UE 110, if a decision about the value m is based on Layer 3 Reference Signal Received Power, RSRP, and/or Reference Signal Received Quality, RSRQ, etc.

At step 530, UE 110 may transmit duplicates of data using the selected/activated set(s) of radio resource configurations. As an example, UE 110 may transmit a first copy of a first data, such as a first PDU, using CG set (2, m=2) on CC2 and a second copy of the first data using CG set (4, m=2) on CC4. Thus, transmissions of m copies of the first data may be done via LCHs that are associated with RLCs that have been activated for duplication, wherein each transmission is performed using a set of radio resource configurations selected/activated at step 520.

At step 540, BS 120 may decide to increase the total number of copies used for duplication of data on the corresponding DRB, i.e., BS 120 may decide to increase the total number of activated duplication legs (equivalently the number of activated RLC entities). BS 120 may make the decision if there is for example a need for performance improvement. As an example, BS 120 may decide to increase the value m from 2 to 3.

Consequently, BS 120 may transmit, at step 550, another activation/deactivation control signaling for duplication, such as a MAC CE, to indicate to UE 110 that duplication should be performed via activation of RLC1, RLC2, and RLC4 (associated with LCH1, LCH2 and LCH4, respectively) for example. That is to say, it may be indicated that three duplication legs should be activated and radio resource configurations for the three (m=3) duplication legs should be selected/activated.

At step 560, responsive to receiving the control signaling, UE 110 may activate RLC1 associated with LCH1, RLC2 associated with LCH2 and RLC4 associated with LCH4 for duplication using three duplication legs, i.e., transmitting duplicates of data. For instance, the CG sets associated with m=3 in these three LCHs may be activated and used for transmission of data, e.g., on a certain DRB. Based on the reception of the activation/deactivation control signaling for duplication, UE 110 may activate/modify the CG configurations corresponding to each of the three LCHs associated with activated RLCs in accordance to m=3. That is to say, the control signaling may comprise an indication about the configuration of duplication, e.g., LCH1, LCH2 and LCH4, corresponding to m=3. Alternatively, or in addition, the criterion associated with the configuration of duplication, such as to consider the number of duplication legs, may be transmitted from BS 120 to UE 110.

So at step 570, UE 110 may transmit a first copy of a second data, such as a second PDU, using the selected/activated CG set (1, m=3) on CC1, a second copy of the second data using the selected/activated CG set (2, m=3) on CC2 and a third copy of the second data using the selected/activated CG set (4, m=3) on CC4. Thus, transmissions of m copies of the second data may be done via selected/activated radio resources in CG sets corresponding to LCHs associated with RLCs that have been activated for duplication, wherein each transmission is performed using a radio resource configuration selected/activated at step 560. The CG configuration sets activated at step 560, for m=3, may have different parameters (e.g. fewer repetitions and/or higher MCS) compared to the CG configuration sets activated at step 520, for m=2.

It should be noted that even though different CG configuration sets may be activated for different total number of duplicates/copies, m, in accordance with an exemplary signalling graph of FIG. 5, the CG configuration sets may be alternatively, or in addition, modified. Thus, in some embodiments of the present invention, instead of providing pre-configuration for multiple CG configuration sets, the network, i.e., BS 120, may pre-configure multiple sets of parameters, such as MCS, number of repetitions and/or transmit power for a CG configuration. Pre-configuration of multiple sets of parameters may be based on scaling and/or delta information associated to a default parameter setting. In such a case UE 110 may directly modify the parameters of a CG configuration accordingly when the value of m changes.

Embodiments of the present invention therefore enable resource efficiency, when possible, for example when a larger transmit diversity via duplication is exploited by transmitting more duplicates of data, such as PDU copies, at a time. At the same time, embodiments of the present invention make it possible to achieve appropriate resource provisioning. Hence, over-provisioning of radio resources may be avoided on each carrier and targeted reliability may still be achieved by duplication of data, such as PDCP duplication, alone. Similarly, depending on whether other selected duplication legs, i.e., LCHs and corresponding RLC entities with data mapping to resources in unlicensed bands, more appropriate radio resource configurations may be chosen to compensate for risks such as Listen-Before-Talk failures in the unlicensed bands.

Figure 6:
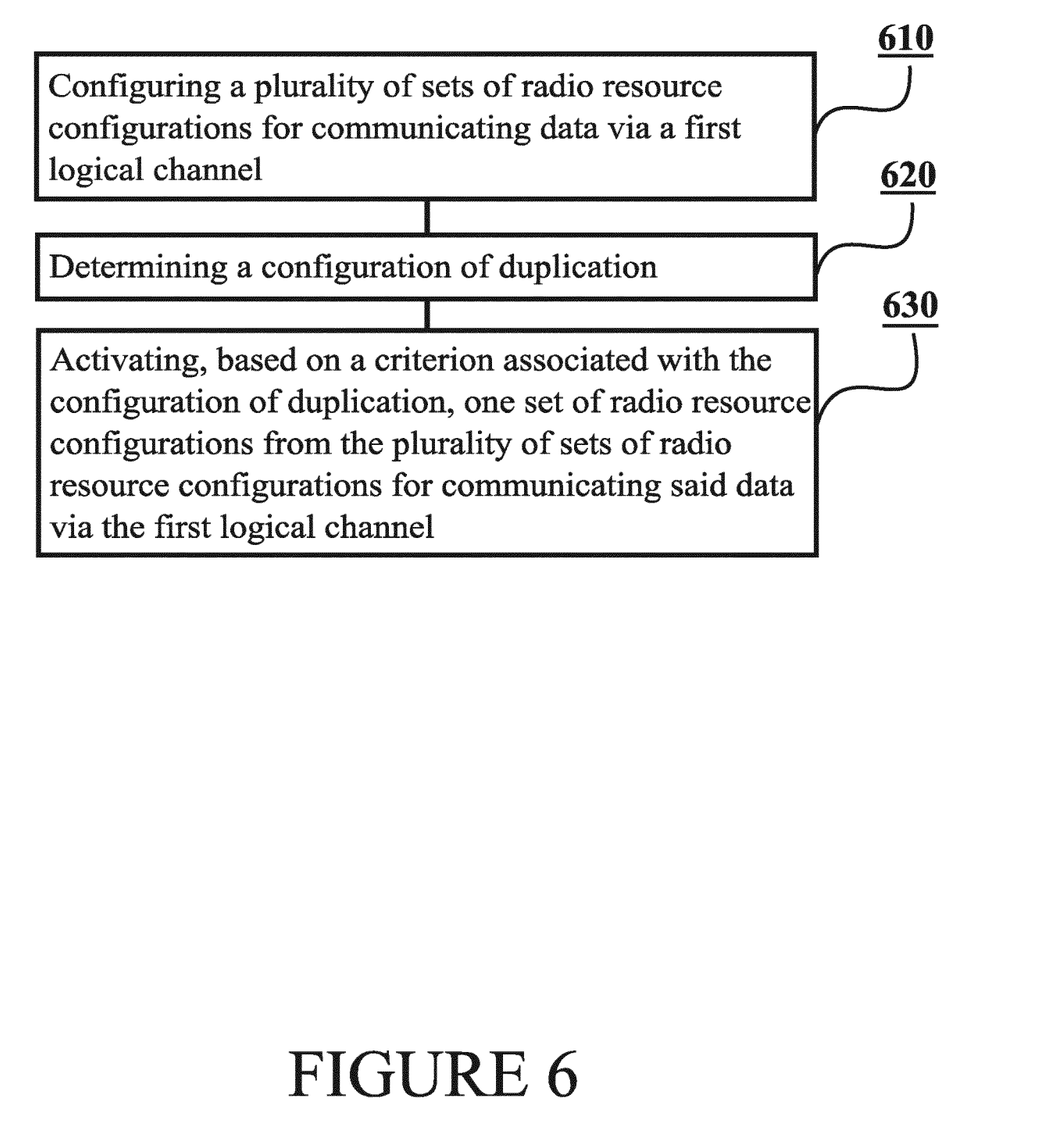
FIG. 6 illustrates a flow graph of a first method in accordance with at least some embodiments.

FIG. 6 is a flow graph of a first method in accordance with at least some embodiments. The phases of the illustrated first method may be performed by BS 120, or by a control device configured to control the functioning thereof, possibly when installed therein.

The first method may comprise, at step 610, configuring a plurality of sets of radio resource configurations for communicating data via a first logical channel. The first method may also comprise, at step 620, determining a configuration of duplication. Finally, the first method may comprise, at step 630, activating, based on a criterion associated with the configuration of duplication, such as the total number of active duplication legs, one set of radio resource configurations from the plurality of sets of radio resource configurations for communicating said data via the first logical channel.

Figure 7:
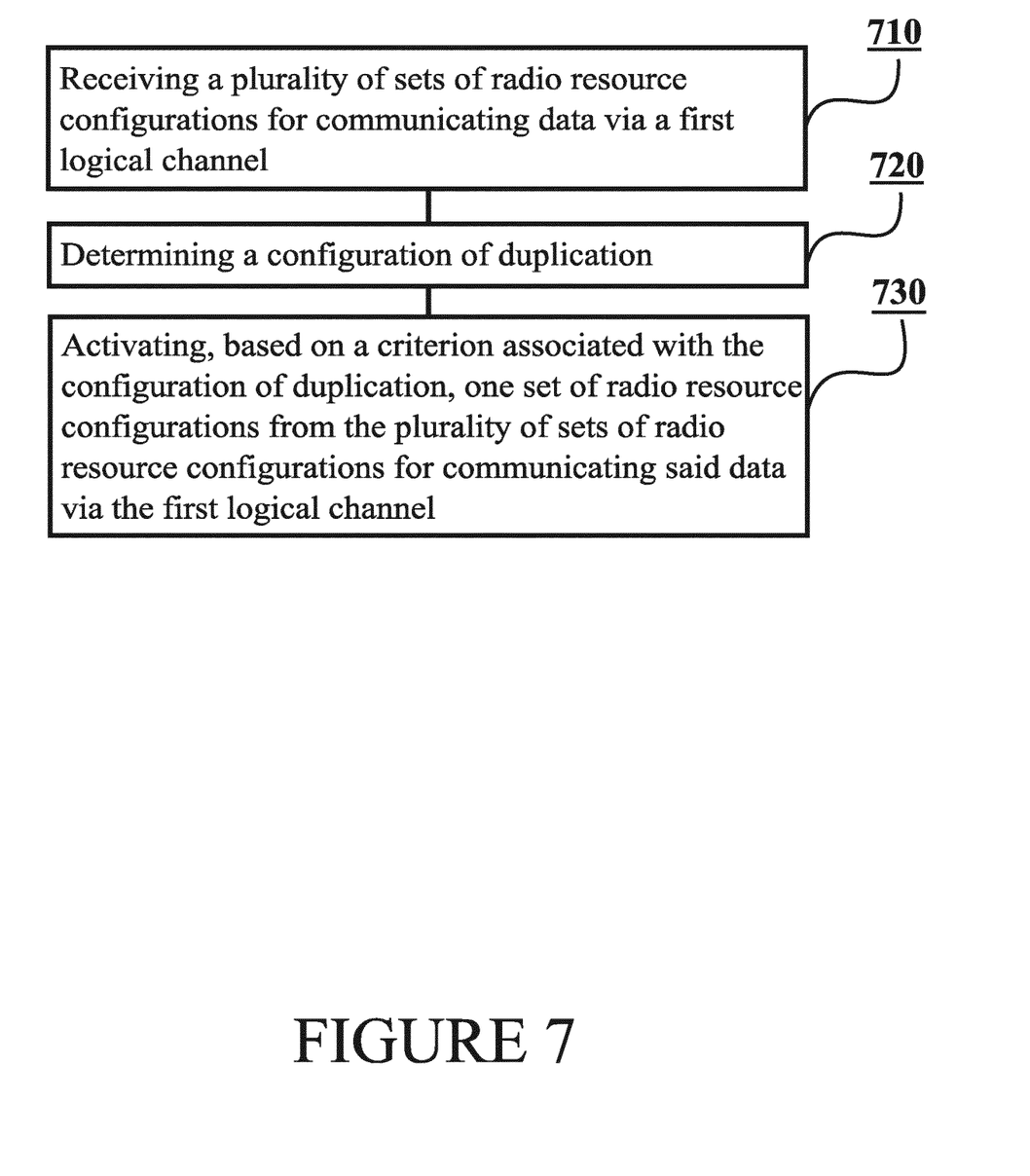
FIG. 7 illustrates a flow graph of a second method in accordance with at least some embodiments.

FIG. 7 is a flow graph of a second method in accordance with at least some embodiments. The phases of the illustrated second method may be performed by UE 110, or by a control device configured to control the functioning thereof, possibly when installed therein.

The second method may comprise, at step 710, receiving a plurality of sets of radio resource configurations for communicating data via a first logical channel. The second method may also comprise, at step 720, determining a configuration of duplication. Finally, the second method may comprise, at step 730, activating, based on a criterion associated with the configuration of duplication, such as the total number of active duplication legs, one set of radio resource configurations from the plurality of sets of radio resource configurations for communicating said data via the first logical channel.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, UE 110 or BS 120, or a control device configured to control the functioning thereof, possibly when installed therein, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, UE 110 or BS 120, or a control device configured to control the functioning thereof, possibly when installed therein, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in wireless communication networks, wherein it is desirable to transmit duplicates of data. More specifically, at least some embodiments find industrial application in cellular communication networks, such as in 5G/NR networks. For instance, embodiments of the present invention may be applied for 5G/NR MAC specification TS 38.321 (e.g. new operations with respect to CG/SPS) and 5G/NR RRC specification TS 38.331 (e.g. extension of CG/SPS configurations).

ACRONYMS LIST

3GPP 3rd Generation Partnership Project
BS Base Station
CA Carrier Aggregation
CC Component Carrier
CE Control Element
CG Configured Grant
DC Dual Connectivity
DRB Data Radio Bearer
GSM Global System for Mobile communication
IIoT Industrial Internet of Things
IoT Internet of Things
LBT Listen-Before-Talk
LTE Long-Term Evolution
M2M Machine-to-Machine
MAC Medium Access Control
MCS Modulation and Coding Scheme
MTC Machine-Type Communications
NFC Near-Field Communication
NR New Radio
PDCP Packet Data Convergence Protocol
PDU Protocol Data Unit
RAT Radio Access Technology
RLC Radio Link Control
RRC Radio Resource Control
RRM Radio Resource Management
RSRP Reference Signal Received Power
RSRQ Reference Signal Received Quality
SIM Subscriber Identity Module
SPS Semi-Persistent Scheduling
UE User Equipment
UI User Interface
URLLC Ultra-Reliable Low-Latency Communications
WCDMA Wideband Code Division Multiple Access
WiMAX Worldwide Interoperability for Microwave Access
WLAN Wireless Local Area Network

| REFERENCE SIGNS LIST | |
| --- | --- |
| 110 | User Equipment |
| 120 | Base Station |
| 130 | Core network |
| 115, 125, 135 | Interfaces |
| 210 | Activation/deactivation control element, e.g., MAC CE |
| 300-370 | Structure of the apparatus of FIG. 3 |
| 411, 413 | Internal signaling |
| 421, 423 | Duplication legs |
| 431, 433 | Plurality of CG sets |
| 441, 443 | Transmissions using selected/activated CGs |
| 510-570 | Signaling steps in FIG. 5 |
| 610-630 | Phases of the first method in FIG. 6 |
| 710-730 | Phases of the second method in FIG. 7 |

The invention claimed is:

1. A method, comprising:
configuring a plurality of sets of radio resource configurations for communicating data via a first logical channel;
determining a configuration of duplication; and
activating, based on a criterion associated with the configuration of duplication, one set of radio resource configurations from the plurality of sets of radio resource configurations for communicating said data via the first logical channel, wherein the communicating includes information relating to the activation that is provided in a control element field $D_i$ of a data radio bearer (DRB), wherein i is in an ascending order of DRB identities among DRBs configured with duplication and with radio link control (RLC) entities associated with a single media access control (MAC) entity, and wherein the control element field $D_i$ is set to 1 indicating that indicating that the duplication status of DRB i is activated and set to 0 indicating that the duplication status of DRB i is not activated, and wherein if the control element field $D_i$ is set to 1, all packet data convergence protocol (PDCP) protocol data units (PDUs) associated with DRB i must be duplicated, and
wherein the communicating includes an indication of a number of copies of data that correspond to a number of activated duplication legs and to a number of activated RLC entities.

2. The method according to claim 1, wherein the first logical channel is for communicating one duplicate of said data, and the method further comprises:
communicating one duplicate of said data using the activated set of radio resource configurations.

3. The method according to claim 1, wherein the radio resource configurations are Semi-Persistent Scheduling, SPS, configurations or Configured Grant, CG, configurations.

4. The method according to claim 1, further comprising:
transmitting an indication about the configuration of duplication and/or the criterion associated with the configuration of duplication.

5. The method according to claim 1, wherein said criterion associated with the configuration of duplication comprises information about a configuration relating to at least one second logical channel or an architecture selected for the duplication, said architecture comprising preferably a Carrier Aggregation, CA, Dual Connectivity, DC, or a combination of CA and DC.

6. The method according to claim 1, wherein said criterion associated with the configuration of duplication comprises characteristics of at least one carrier for at least one second logical channel.

7. The method according to claim 6, wherein said characteristics comprise information about whether the at least one second logical channel is configured for communication on at least one carrier of licensed spectrum or at least one carrier of unlicensed spectrum.

8. The method according to claim 1, wherein said criterion associated with the configuration of duplication comprises a number of copies of the data to be communicated.

9. The method according to claim 1, wherein the first logical channel is associated with a first activated Radio Link Control, RLC, entity.

10. The method according to claim 1, wherein the data comprises a Protocol Data Unit, PDU, and communicating duplicates of data comprises communicating duplicates of a Packet Data Convergence Protocol, PDCP, PDU.

11. The method according to claim 1, wherein a set of scaling and/or delta parameters is selected, based on the criterion associated with the configuration of duplication, for each radio resource configuration of the activated set of radio resource configurations, said parameters comprising preferably a number of repetitions, Modulation and Coding Scheme, MCS, and/or transmission power.

* * * * *